(12) United States Patent
Lee

(45) Date of Patent: Oct. 18, 2005
(10) Patent No.: US 6,956,627 B2

(54) ELECTRONIC APPARATUS WITH LIQUID CRYSTAL DISPLAY, DIGITIZER, AND HOUSING, FASTENED BY SCREWS

(75) Inventor: Ping Lee, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 91 days.

(21) Appl. No.: 10/658,424

(22) Filed: Sep. 10, 2003

(65) Prior Publication Data

US 2004/0046906 A1    Mar. 11, 2004

(30) Foreign Application Priority Data

Sep. 10, 2002   (TW) ................ 91120653 A

(51) Int. Cl.⁷ ............................. G02F 1/1333
(52) U.S. Cl. .................. 349/58; 349/12; 345/173
(58) Field of Search ................ 349/58–60, 12; 345/173, 175, 177

(56) References Cited

U.S. PATENT DOCUMENTS

| | | | | |
|---|---|---|---|---|
| 5,977,888 A * | 11/1999 | Fujita et al. ................ 341/34 |
| 6,031,524 A * | 2/2000 | Kunert ........................ 345/173 |
| 6,067,133 A * | 5/2000 | Niibori et al. ................ 349/60 |
| 6,330,150 B1 * | 12/2001 | Kim ........................... 361/683 |
| 6,654,078 B1 * | 11/2003 | Kato et al. .................... 349/58 |
| 6,747,713 B1 * | 6/2004 | Sato ............................ 349/58 |

\* cited by examiner

*Primary Examiner*—Andrew Schechter
(74) *Attorney, Agent, or Firm*—Troxell Law Office, PLLC

(57) ABSTRACT

An electronic apparatus with a liquid crystal display comprises the following components. A liquid crystal display module has a backlight module and a glass panel, both are fastened in a display frame, wherein the display frame has a first fastening hole formed thereon. A digitizer comprises a sensor board and a control board connected together by a connecting bus, wherein the sensor board has a second fastening hole formed thereon and aligned with the first fastening hole when the sensor board is assembled into the liquid crystal display module. And a housing of the electronic apparatus is applied to receive the liquid crystal display module and the digitizer in the electronic apparatus, wherein the housing has a third fastening hole formed thereon and aligned with the second fastening hole and the first fastening hole. Thus by threading a screw through the first fastening hole, the second fastening hole and the third fastening hole, the liquid crystal display module and the digitizer can be fastened into the electronic apparatus.

5 Claims, 3 Drawing Sheets

ELECTRONIC APPARATUS WITH LIQUID CRYSTAL DISPLAY, DIGITIZER, AND HOUSING, FASTENED BY SCREWS

FIELD OF THE INVENTION

The present invention relates to a liquid crystal display with a digitizer and the related fastening manner, and more specifically, to a convenient assembling design for fastening a sensor board and the liquid crystal display into the electronic apparatus.

BACKGROUND OF THE INVENTION

With the advance of techniques for manufacturing thin-film transistors, the liquid crystal displays (LCD) are widely applied in electrical products, such as PDAs, laptops, digital cameras, cell phones, high resolution television sets, etc. due to advantages as portability, non-radiation and saving electricity. Especially when the manufactures devote themselves to further research and improve the materials, processes and equipments for producing LCD devices, the qualities of the LCDs are promoted and prime costs are reduced substantially:

In general, on these electronic products, such as PDAs or notebook, are assembled with keyboards for providing consumers to input data and orders. However, because the current design trend of the electronic products is towards portability, the keyboards occupied the part space of the electronic products usually hinder from the portability. For solving this problem, touch screens are introduced to the electronic products.

In the conventional touch screen, a touch panel is fabricated on a display to provide consumers convenience to input data and orders by utilizing a hand-held stylus in conjunction with the touch screen display. However, because it is indispensable to fabricate the touch panel onto the surface of display, some light source is obstructed, and thus the image displaying efficiency is decreased. Even though the transparency of the touch panel in current products is promoted about 85%, for most electronic products with touch panels, the extra backlight sources are still required to provide enough illumination. And the transparency limitation of the touch panel still squanders lots of electrical power.

For thoroughly overcoming the above issues, the display manufacturers apply the digitizer to substitute for the conventional touch screen. Please refer to FIG. 1, a liquid crystal display 10 integrated with a digitizer 40 is illustrated. In general, the liquid crystal display 10 comprises a glass panel 20 and a backlight module 30. The glass panel 20 has an upper glass substrate 22, a lower glass substrate 24, and a liquid crystal layer inserted therebetween. On the lower glass substrate 24 some pixel arrays composed of thin film transistors are fabricated. A printed circuit board assembly (PCB assembly) 27 is electrically connected to the lower glass substrate 24 via a flexible printed circuit (FPC) 29. By using a timing control chip 25 fabricated on the PCB assembly 27, the pixel arrays can be switch on or off to form pictures on the display.

The backlight module 30 comprises a lightguide 32, optical films 34, a white sheet 36, a lamp 38 and a reflector cover 39. The lightguide 32 made of acrylics is applied to provide light propagating paths. Aside the lightguide 32 mounted the lamp 38 is applied to illuminate the lightguide 32 in the edgelight form. The light entering from one side of the lightguide 32 can propagate to another side thereof in the total reflection form. Aside the lamp 38 the reflector cover 39 is applied to prevent the lights from dissipating. The white sheet 36 is disposed beneath the lightguide 32 to reduce light dispersing. And the optical films 34 having some diffuser films and brightness enhancing films are introduced to scatter the light more uniformly.

Besides, the digitizer 40 comprises a sensor board 42 and a control board 44. The sensor board 42 has grid type of antenna arrays formed therein to receive electromagnetic signals. When consumers utilize a hand-held stylus to select or input data on the glass panel 20, the sensor board 42 can receive the electromagnetic signals and transfer these signals to the control board 44 via a connecting bus 46. Then the control board 44 can decode these signals and communicate with the motherboard of the electronic product. On the control board 44 an ASIC chip 48 is mounted for providing the above decoding and communicating functions.

In the conventional assembling procedures for the backlight module 30, a bezel and a frame are jointed together for receiving the components of lightguide 32, optical films 34, the white sheet 36, the lamp 38 and the reflector cover 39. Next the backlight module 30 and the glass panel 20 are disposed and received in a display frame. And the display manufacture will use screws to fix the backlight module 30 and the glass panel 20 onto the display frame. After assembling the liquid crystal display module 10, the display manufacturer will use screws again to fasten the sensor board 42 and the liquid crystal display module 10, and then exports these products to system manufacturers. After that, the system manufacturers can integrate the liquid crystal display module 10 and the digitizer 40 into different electronic apparatus, such as laptops, PDAs, etc.

Notedly, when the system manufacturer assembles the liquid crystal display module 10 into the electronic apparatus, they still have to utilize screws to fasten the sensor board 42 into the electronic apparatus. Therefore, it is indispensable to form additional fastening holes on the sensor board 42, first for providing the display manufacturer to fasten the sensor board 42 onto the liquid crystal display module 10, and next for providing the system manufacturer to fasten the sensor board 42 into the electronic apparatus.

This assembling manner apparently has some disadvantages. First, the number of fastening times is too much, and thus the producing cycle time is too long. Second, on the sensor board it is required to form extra fastening holes and utilize more screws for fastening the sensor board and the liquid crystal display module firstly, and for fastening the sensor board into the electronic apparatus sequently, so the production cost is excess. Besides, the available space of the liquid crystal display module 10 is also limited by the extra fastening holes and screws.

SUMMARY OF THE INVENTION

The prime objective of the present invention is to provide a method of assembling a digitizer into the electronic apparatus that has a liquid crystal display device.

Another objective of the present invention is to provide a manner of assembling a digitizer and a display module into an electronic apparatus in which the first screwing procedure of fastening the digitizer and the display module by the display manufacturer is no longer required.

The present invention provides a method of assembling a liquid crystal display into an electronic apparatus. The liquid crystal display is assembled by the display manufacturer and then is exported to the system manufacturer for assembling it into the electronic apparatus. The method comprises the following steps. First, a display frame having a first fastening hole and a second fastening hole formed on a peripheral region thereof is provided. A glass panel is placed on the display frame. And next a backlight module is placed on the glass panel, wherein the backlight module has a third fastening hole and a fourth fastening hole formed thereon and aligned with the first fastening hole and the second fastening hole respectively.

The display manufacturer can thread a first screw through the first fastening hole and the third fastening hole for fastening the display frame and the backlight module together and fixing the glass panel therebetween. Then, a digitizer is placed on the liquid crystal display module. The digitizer comprises a sensor board and a control board connected together by a connecting bus. And the sensor board is placed on the backlight module and has a fifth fastening hole formed thereon and aligned with the fourth fastening hole and the second fastening hole.

After the display manufacturer exporting the liquid crystal display devices to the system manufacturer, a housing of the electronic apparatus is provided for receiving the liquid crystal display module and the digitizer. The housing of the electronic apparatus has a sixth fastening hole thereon aligned with the fifth fastening hole, the fourth fastening hole and the second fastening hole. The system manufacturer can thread a second screw through the sixth fastening hole, the fifth fastening hole, the fourth fastening hole and the second fastening hole to fasten the liquid crystal display module and the digitizer into the electronic apparatus.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
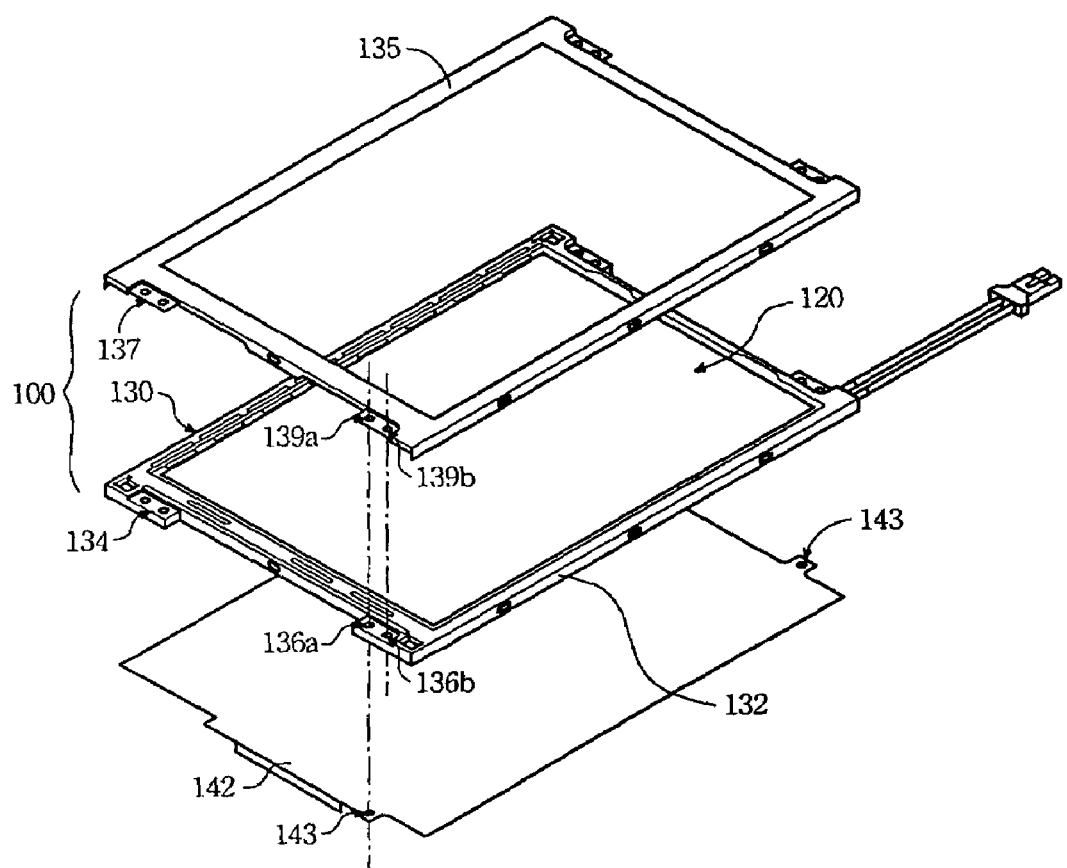
FIGS. 2 & 3 illustrate the manner of assembling the digitizer and the liquid crystal display together according to the present invention.

Please refer to FIG. 2, the liquid crystal display provided in the present invention is illustrated. As aforementioned, after fabricating the liquid crystal displays, the display manufacturer exports those display products to the system manufacturer. Then the system manufacturer can assemble the liquid crystal displays into the electronic apparatus. It is noted that the liquid crystal display in FIG. 2 illustrates the structure of the liquid crystal display fabricated by the display manufacturer. The liquid crystal display comprises a liquid crystal display module 100 and a sensor board 142. The liquid crystal display module 100 is fabricated by assembling a backlight module 130 and a glass panel 120 into a display frame 135.

Figure 1:
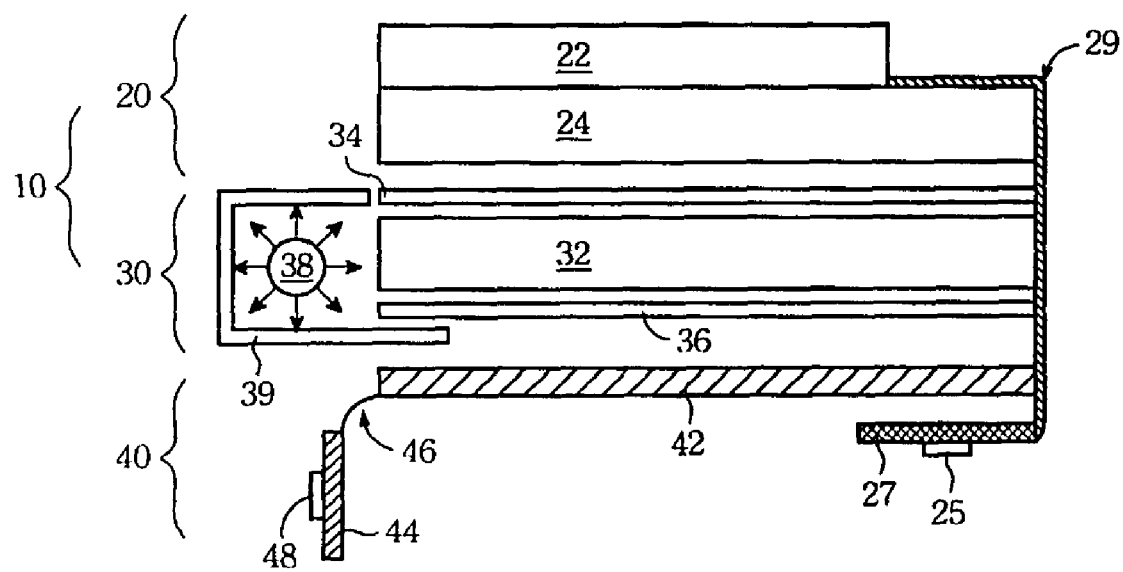
FIG. 1 illustrates the cross section view of the liquid crystal display with the digitizer in the prior art.

The components of the backlight module 130 as shown in the FIG. 1 comprise a lightguide, optical films, a white sheet and an edgelight source. And for containing those components of the backlight module 130, a rectangular bezel, preferably made of aluminum, is provided first. Then the white sheet, the edgelight source, the lightguide and the optical films are placed on the bezel in sequence. Next, a rectangular frame is covered and jointed with the bezel to receive the above components.

Please refer to FIG. 2, the casing 132 composed of the frame and the bezel also has a rectangular shape. On four corners of the casing 132 are fabricated four sheets 134 respectively. Each sheet 134 has fastening holes 136a and 136b formed thereon for screwing the backlight module 130 onto the display frame 135. As shown in FIG. 2, on a short edge of the rectangular casing 132 two sheets 134 extend outwardly and oppositely along the short edge. And on each sheet 134, two fastening holes 136a and 136b penetrating through the sheet 134 are formed.

As to the display frame 135 used to assemble the backlight module 130 and the glass panel 120 also has a rectangular shape. And on four corners of the display frame 135 four rectangular sheets 137 are fabricated respectively for fastening. Refer to FIG. 2, on a short edge of the rectangular display frame 135 two sheets 137 are fabricated to extend outwardly and oppositely along the short edge. And on each sheet 137 two fastening holes 139a and 139b penetrating through the sheet 137 are formed. Thus, when the display manufacturer assembles the liquid crystal display module 100, the glass panel 120 is placed on the casing 132 of the backlight module 130. And then the display frame 135 is disposed on the glass panel 120 and the backlight module 130.

When the display frame 135 is assembled on the backlight module 130 and the glass panel 120, the fastening holes 139a and 139b are aligned with the fastening holes 136a and 136b of the casing 132. Thus, by threading screws through the fastening holes 136b and 139b on four corners thereof respectively, the casing 132 can be fastened on the display frame 135.

Under the backlight module 130 a digitizer is fabricated to provide consumers for inputting data and orders by a hand-held stylus. Similar, the digitizer comprises a sensor board and a control board connected by a connecting bus. Please refer to FIG. 2, the sensor board 142 is a rectangular board. And on a short edge of the sensor board 142 the fastening hole 143 is formed and aligned with the fastening hole 136a of the casing 132 and the fastening hole 139a of the display frame 135.

Figure 3:
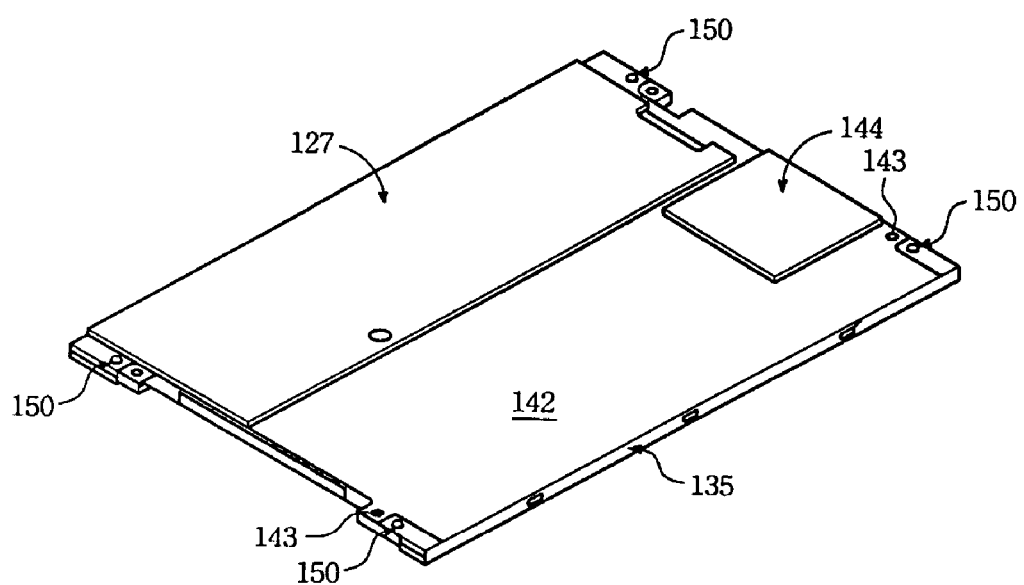

Please refer to FIG. 3, the assembled structure of the sensor board 142, the backlight module 130, the glass panel 120 and the display frame 135 is illustrated. It is noted that FIG. 3 illustrates the reverse view of the structure in FIG. 2. And only the display frame 135 and the sensor board 142 are shown because the backlight module 130 and the glass panel 120 both are assembled in the display frame 135.

Though the printed circuit board and the flexible printed circuit bus (FPC bus) connected to the glass panel 120 are not shown in FIG. 2, and the control board and the connecting bus connected to the sensor board 142 also are not shown. However, as well known, these circuits boards are attached beneath the sensor board 142 by winding the FPC bus and the connecting bus as shown in FIG. 1 to prevent the sensor board 142 from noise interference by the signals passing on the printed circuit boards. Refer to FIG. 3, the printed circuit board 127 connected to the glass panel is attached on the backside of the sensor board 142 by winding the FPC bus. And the control board 144 connected to the sensor board 142 via the connecting bus is also attached on the backside thereof by winding the connecting bus to reduce the space occupied by the liquid crystal display module.

Besides, it is noted that when the display manufacturer assembles the sensor board 142 into the display frame 135 as shown in FIG. 3, the sensor board 142 is just placed on the display frame 135 and still not screwed with the display frame 135 and the backlight module 130. Namely, in the aligned fastening holes 139a, 136a and 143, no screw is threaded through yet. As to the casing 132 of the backlight module and display frame 135 are fastened together by threading screws into the aligned fastening holes 136b and 139b. Thus, after the display manufacturer exporting to the system manufacturer, the liquid crystal display module 100 and the digitizer 142 can be directly screwed and fastened into the housing of the electronic apparatus, such as laptops and the PDAs, by threading screws through the fastening holes 139a, 136a, 143, and through fastening holes formed on the housing of the electronic product by the system manufacturer.

Compared to the conventional assembling manner, the display manufacturer does not have to form extra fastening holes both on the sensor board and the liquid crystal display module for fastening the sensor board onto the display frame first. Thus, the amount of components can be reduced, and the production cost can be effectively decreased. And the number of fastening times can also be reduced to further promote the throughput.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar design.

What is claimed is:

1. A method for assembling a liquid crystal display into an electronic device, said method comprises the steps of:
    providing a display frame which has a first fastening hole and a second fastening hole disposed on a peripheral region thereof;
    disposing a glass panel on said display frame;
    disposing a backlight module on said glass panel, wherein said backlight module has a third fastening hole aligned with said first fastening hole and a fourth fastening hole aligned with said second fastening hole respectively;
    threading a first screw through said first fastening hole and said third fastening hole for fastening said display frame and said backlight module together and fixing said glass panel therebetween;
    placing a digitizer on said liquid crystal display module, wherein said digitizer comprises a sensor board and a control board which is connected with said sensor board via a connecting bus, said sensor board is placed on said backlight module and has a fifth fastening hole formed thereon, wherein said fifth fastening hole is aligned with said fourth fastening hole and said second fastening hole;
    providing an electronic apparatus for receiving said liquid crystal display module and said digitizer, wherein a housing of said electronic apparatus has a sixth fastening hole formed thereon and aligned with said fifth fastening hole, said fourth fastening hole and said second fastening hole; and
    threading a second screw through said sixth fastening hole, said fifth fastening hole, said fourth fastening hole and said second fastening hole for fastening said liquid crystal display module and said digitizer into said electronic apparatus.

2. An electronic apparatus with a liquid crystal display comprising:
    a liquid crystal display module having:
    a backlight module assembled in a casing, wherein said casing has a first fastening hole and a second fastening hole formed thereon;
    a glass panel placed on said casing of said backlight module;
    a display frame placed on said glass panel, wherein said display frame has a third fastening hole aligned with said first fastening hole and a fourth fastening hole aligned with said second fastening hole respectively;
    wherein a screw is threaded through said first fastening hole and said third fastening hole for fastening said display frame and said backlight module together and fixing said glass panel therebetween;
    a digitizer comprising a sensor board and a control board connected with said sensor board via a connecting bus, wherein said sensor board has a fifth fastening hole aligned with said second fastening hole and said fourth fastening hole when said sensor board is assembled with said liquid crystal display module; and
    a housing for receiving said liquid crystal display module and said digitizer in said electronic apparatus, wherein said housing has a sixth fastening hole thereon aligned with said fifth fastening hole, said fourth fastening hole and said second fastening hole;
    wherein a screw threaded through said sixth fastening hole, said fifth fastening hole, said fourth fastening hole and said second fastening hole for fastening said liquid crystal display module and said digitizer in said electronic apparatus.

3. The electronic apparatus of claim 2, wherein said casing of said backlight module has a rectangular shape, and has two sheets fabricated on a short edge of said casing and extending outwardly and oppositely along said short edge, and each said sheet has said first fastening hole and said second fastening hole formed thereon.

4. The electronic apparatus of claim 2, wherein said display frame has a rectangular shape, and has two sheets fabricated on a short edge of said display frame and extending outwardly and oppositely along said short edge of said display frame, and each said sheet has said third fastening hole and said fourth fastening hole formed thereon.

5. The electronic apparatus of claim 2, wherein said sensor board has a rectangular shape, and has said fifth fastening hole formed on a short edge of said sensor board.

* * * * *